United States Patent [19]

Yang

[11] Patent Number: 5,506,456

[45] Date of Patent: Apr. 9, 1996

[54] POWER UNIT WITH CONTROLLED OUTPUT VOLTAGE

[76] Inventor: Tai-Her Yang, 5-1 Taipin St., Si-Hu Town, Dzan-Hwa, Taiwan

[21] Appl. No.: 346,362

[22] Filed: Nov. 29, 1994

Related U.S. Application Data

[63] Continuation of Ser. No. 34,716, Mar. 22, 1993, abandoned.

[51] Int. Cl.$^6$ ......................................................... H02J 1/00
[52] U.S. Cl. ................................. 307/81; 307/63; 307/77
[58] Field of Search ................................ 307/43, 54, 61, 307/63, 77, 80, 81, 85; 323/283; 363/65, 71

[56] References Cited

U.S. PATENT DOCUMENTS

| | | | |
|---|---|---|---|
| 4,175,249 | 11/1979 | Gruber | 323/15 |
| 4,412,137 | 10/1983 | Hansen et al. | 307/10 R |
| 4,788,452 | 11/1988 | Stanley | 307/71 |
| 4,814,631 | 3/1989 | Jackson | 307/53 |
| 5,045,990 | 9/1991 | Stanley | 363/43 |
| 5,121,046 | 6/1992 | McCullough | 320/16 |
| 5,352,931 | 10/1994 | Yang | 307/81 |

FOREIGN PATENT DOCUMENTS

197239  7/1965  Sweden ........................... 307/71

*Primary Examiner*—Peter S. Wong
*Assistant Examiner*—Adolf Berhane
*Attorney, Agent, or Firm*—Leonard Bloom

[57] ABSTRACT

The present invention is intended to provide an effective power unit with controlled output which can output graded output voltage in a wide range of required output voltages. The power unit also provides output voltage as a linear, chopped or PW modulated voltage. The power unit includes a plurality of substantially identical battery units which can be connected in series and/or in parallel with each other by respective switches, said switches (two-pole two-throw, one-pole one-throw, solid state) are controlled by a central control unit in respect to the required output voltage. Voltage inspection device and current inspection device provide a feedback to the central control unit to be compared with the predetermined value. Solid switch member provides linearization, chopping or PW modulation of the graded output voltage. The output voltage supplied by the power unit takes values of N×B, wherein N=1, 2, 3, . . . , and EB is the terminal output voltage of each battery unit. A plurality of diodes are connected to respective battery units and switches.

1 Claim, 11 Drawing Sheets

| | SSS100 | SW500 | SW501 | SW502 | SW503 | SW504 | SW505 |
|---|---|---|---|---|---|---|---|
| H | | ON | ON | ON | OFF | OFF | ON |
| M↔H | ON | ON | ON | ON | OFF | OFF | OFF |
| M | | ON | OFF | ON | OFF | OFF | ON |
| L↔M | ON | ON | OFF | ON | OFF | OFF | OFF |
| L | | ON | OFF | | ON | | |
| 0↔L | ON | OFF | OFF | OFF | ON | ON | |

POWER UNIT WITH CONTROLLED OUTPUT VOLTAGE

This application is a continuation of application Ser. No. 08/034,716, filed Mar. 22, 1993, now abandoned.

FIELD OF THE INVENTION

The present invention relates to power sources, and more particularly, to a power source with adjustable output voltage.

BACKGROUND OF THE INVENTION

Since batteries are portable and mobile, they are widely used for various kinds of appliances, including electric vehicles. Although there are a lot of types of batteries, including fuel, thermal, sun-power, etc., they all possess a basic feature, i.e., output voltage. It is highly desirable to adjust the output voltage to requirements of equipment to be powered.

SUMMARY OF THE INVENTION

The inventor of the present invention proposed an efficient circuit providing a graded output voltage, which is further controlled by a solid state switch member so as to supply to the equipment to be powered an output voltage in a wide range of values, and also as a low-ripple linear voltage or low-ripple chopped voltage. According to the present invention, a power unit with controlled output voltage comprises a plurality of substantially identical battery units which are connected by a control unit in a series and/or parallel arrangement for providing a required output voltage on a pair of output terminals in a wide range of graded output voltages. Said power unit includes a plurality of two-pole two-throw switches, each switch including a pair of common contacts, a pair of normally closed contacts, and a pair of normally opened contacts.

Central control unit controls state of each switch according to required load. The output voltage can be linearized, chopped or pulse-width modulated according to requirements of equipment to be powered. A plurality of diodes are connected between said switches to further control the switches and to reduce current feedback.

These and other objects of the present invention will become apparent from a reading of the following specification taken in conjunction with the enclosed drawings.

DETAILED DESCRIPTION OF THE INVENTION

Figure 1:
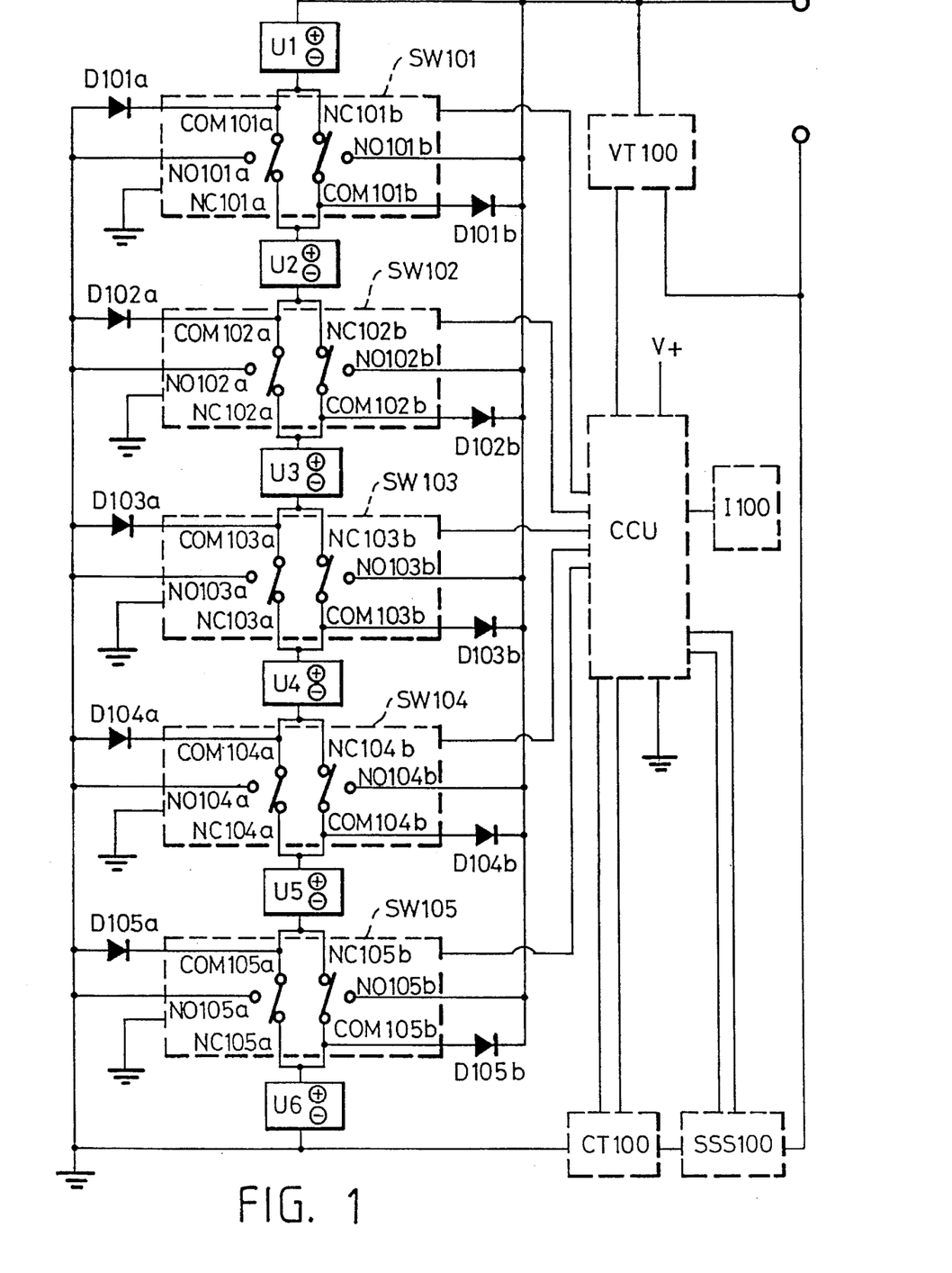
FIG. 1 is a view of a power unit of the present invention.

Referring to FIG. 1, the present invention includes $U_1$–$U_6$ battery units, connected by two throw (C) contact switches (SW101–SW105). An output voltage which is output between a positive (+) and negative (−) terminals, is composed of basic output voltages (EB) of each battery unit ($U_1$–$U_6$). The value of the output voltage depends on type of connection between said battery units ($U_1$–$U_6$). Switches (SW101–SW105) are connected to diodes D101a–D105a, D101b–D105b so as to eliminate diodes direct voltage reducing and thermal loss, and it can be also combined with a current and a voltage inspection device (VT100, CT100), solid state switch member (SSS100), and be further combined with a central control unit (CCU) to receive instruction from input device so as to control electro-mechanical switches (SW101–SW105) and solid state switch member (SSS100) for adjusting output voltage current flow or adjusting the output constant voltage, or set predetermined values of output current or constant current. By means of linearization or chopping the output voltage, or PWM control provided by the solid state switch member SSS100 which is connected in series with battery units and respective diodes and between respective on-off switches (SW101–SW105), shape of the output voltage is modulated, such that the low pressure corresponding to the lowest grade of output voltage becomes bottom and high pressure corresponding to the following higher grade of the output voltage becomes peak for the circuit of linear adjustment and PWM adjustment of output voltage, and the low ripple-wave output voltage is formed between the bottom and the peak. It is further being linearized, or PWM modulated. When electro-mechanical switch (SW101–SW105) is turned on, the time of operation (SSS100) (on) of solid state switch is suspended at the on position. When the switch (SW101–SW105) is turned off, the operation time of solid state switch (off) precedes the electro-mechanical switch (SW101–SW105) to cut off power supply and reach the non-sparkle on-off electro-mechanical switches. This function further comprises the non-sparkle turning on/off of positive/negative pole of switches (SW101–SW105).

The structure and operation of the embodiment are disclosed as follows:

A plurality of battery units of substantially the same voltage and/or the same capacity, (including linear or quadratic storage battery, sun-power battery, fuel battery, thermal battery) are connected by means of a manual two-pole two-throw switch, drum switch, or electro-mechanical switch members, including magnetically or mechanically operated relay. The switches are connected between battery units and are to be in direct-polar series with the respective battery unit. Each switch (SW101–SW105) includes a first and a second common contacts, a first and a second normally closed contacts, and a first and a second normally opened contacts, such that in each switch the first common contact is connected to the second normally closed contact, and the second common contact is connected to the first normally closed contact. The switches are connected between the respective battery units such that the negative terminal of each battery unit is connected to both the first common contact and the second normally opened contact of the switch, respectively, and the positive terminal of another battery unit is connected to both the first normally opened contact and the second common contact of the switch, such that when respective switches are actuated by the central control unit, the respective common contacts are connected to respective normally opened contacts or to respective normally closed contacts. This provides serial and/or parallel connection between respective battery units.

The aforesaid circuit as described herein has the following functions and advantages:

1. Due to the common contact being symmetric to on/off switch, added to opened or closed contacts, it can provide a wide range of values for output voltage.

2. When output, all contacts of diodes are tended to close, so that they can eliminate direct pressure drop and thermal loss of respective diodes.

3. When turned on/off, the respective diode provides linear graded output voltage for reducing switch voltage. The diode is used as transient current path to prolong the life of the respective switch.

4. On-off switch or a solid state switch member can be further selected to be two-phase conductive member. It can be connected also in inverse-direction so as to provide for control over the input voltage and current, or a serial and a parallel connection of on-off power unit when it is inversely input from the output end, and for control over solid state switch member (if there is one) so as to fit the requirements of external input power.

Referring to FIG. 1, the power unit of the present invention is composed of switch SW101–SW105 between six sets of battery units $U_1$–$U_6$, each switch SW101–SW105 has a diode D101a–D105a and a diode D101b–D105b. Each diode has a respective positive and negative terminal. Each pair of diodes (D101a–D101b, D102a–D102b, etc.) is connected to each switch such that the first diode (D101a) of the pair is connected by its negative terminal to the first normally opened contact and by its positive terminal to the first common contact, and the second diode of the pair is connected by its negative terminal to the second common contact and by its positive terminal to the second normally opened contact. When common contact and normally closed contact of operating switch SW101–SW105 are closed, all battery units ($U_1$–$U_6$) contribute to the output voltage, the value of which is 6× EB; that is, every three sets of battery units tend to be in series and then each set of three battery units are paralleled. When common contacts SW102 and SW104 are connected to normally opened contacts, the output voltage will be 2×EB; that is, every two battery units are in series and then each set of two battery units are paralleled. When common contacts of switch SW101–SW105 are connected to open contacts, the output voltage will be EB; that is, battery unit $U_1$–$U_6$ are in parallel. If we use 24 sets of battery units, we can obtain output voltages of 1 ×EB, 2×EB, 3×EB, 4×EB, 6×EB, 8×EB, 12×EB, 24×EB. If we use 36 sets of battery units, we can obtain values of 1× EB, 2×EB, 3×EB, 4×EB, 6×EB, 9×EB, 12×EB, 18×EB, 36 ×EB. Said switches can be manually operated, or be controlled by a central control unit (CCU) and directory input unit (I100) so as to control the respective switch to turn the output voltage on/off; or to further include in the power unit a solid state switch member SSS100 at the output terminal in order to control a state of electro-mechanical switches and state of solid state switches which can replace the respective electro-mechanical switches. It is intended, directly by means of linear solid state switch member SSS100, to trim the output graded voltage (or controlling electro-mechanical switch), make the output voltage higher than the needed value of the output voltage, and then use the central control unit (CCU) to control the current of linear solid state switch member (SSS100) so as to get the adjustment of linear output voltage.

Figure 2:
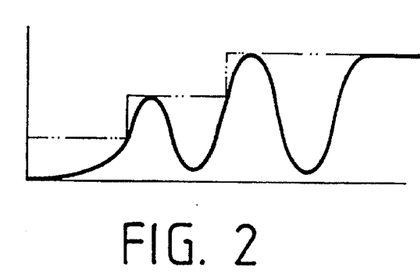
FIG. 2 is a timing diagram showing a linear output voltage.

Referring to FIG. 2, if we want to trim the adjustment of a voltage higher than a battery unit output voltage (EB), we can do it by means of electro-mechanical switch and its thermal loss will be reduced. Switching the solid state switch member (SSS100), it is possible to trim the output graded voltage (or controlling electro-mechanical switch), i.e., to make the output higher than the needed output value, and then use the central control unit (CCU) to control the drive pulse range of switched solid state switch member (SSS100) so as to attain the adjustment of average output voltage.

Figure 3:
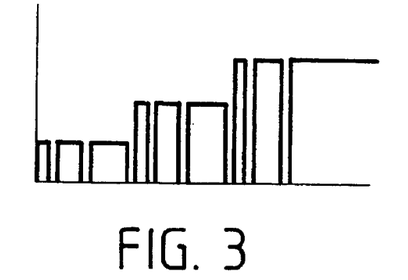
FIG. 3 is a timing diagram showing a chopped wave adjustment of an output voltage.

Referring to FIG. 3, if we want to trim the adjustment of a voltage higher than a battery unit output voltage (EB), it is possible by means of electro-mechanical switch, because it has graded basic voltage. A ripple-wave value will be lower than that of the output voltage adjustment in whole.

We can further connect an inspection device CT100 in series with the output battery unit so as to inspect its output current value and feeding back to central control unit (CCU), according to the input unit instruction or the preset value in CCU, and control the electro-mechanical switch and/or solid state switch.

The inspection device VT100 connected to the output terminals serves for inspection of the output voltage value which feeds back to CCU. The solid state switch and/or electro-mechanical switch are further controlled in accordance with instructions of the input unit, and the inspection device VT100. In addition to adjusting the output voltage to changing caused by unsteady load, the circuit of the present invention can also be adjusted to changing caused by unsteady power voltage. For example, if voltage drops in a battery because of reducing the storage, or voltage is unsteady in a sun-power battery because of sunlight energy changings, the output voltage will be adjusted to a standard voltage.

Another important feature is that by means of the following controlling order, we may achieve the following functions: when switching on the electro-mechanical switch, the solid state switch (on) operation time is suspended after the electro-mechanical switch; at the "off" position, solid state switch (off) operation time precedes electro-mechanical switch to turn the power off so as to attain non-sparkle on/off electro-mechanical switch; this switch further includes non-sparkle switching of positive and negative poles.

The above-described operational order includes manual, electro-mechanical, mechanical, and hydro control.

Figure 4:
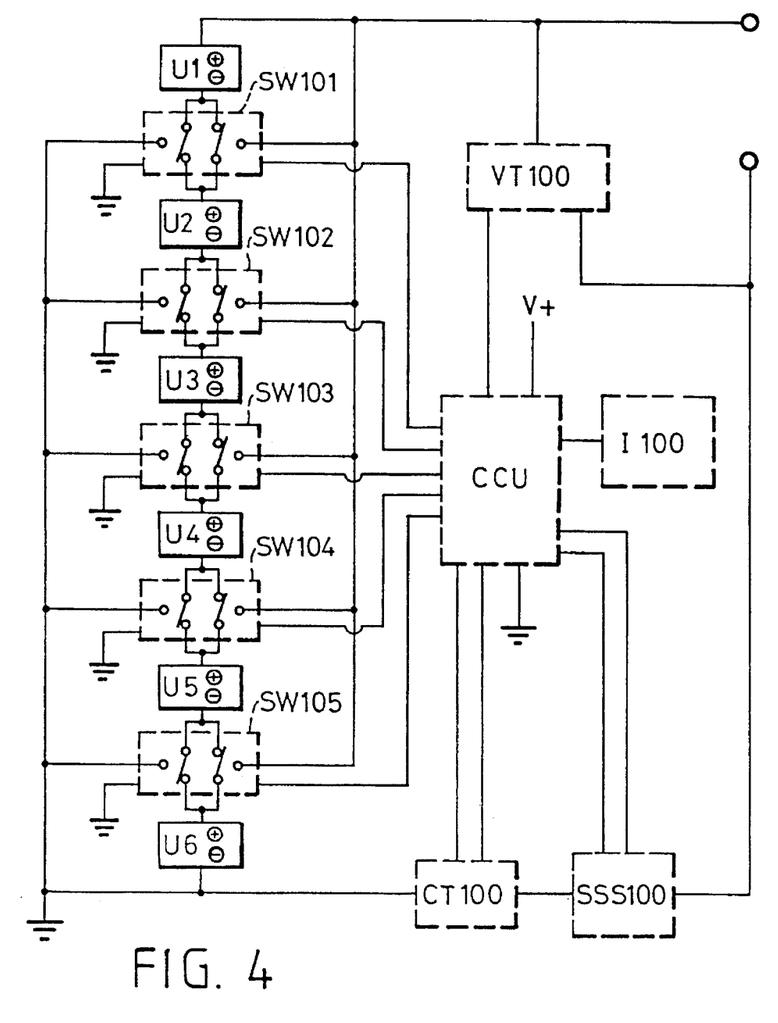
FIG. 4 is a view of the embodiment of the circuit of FIG. 1 which does not include a plurality of diodes.

In practical use, if power capacity is lower, diodes can be omitted and two-pole two-throw switch can directly turn on/off without additional controlling function of respective diodes. FIG. 4 is a view of the circuit of the present invention similar to one shown in FIG. 1, wherein diodes are not employed.

Figure 5:
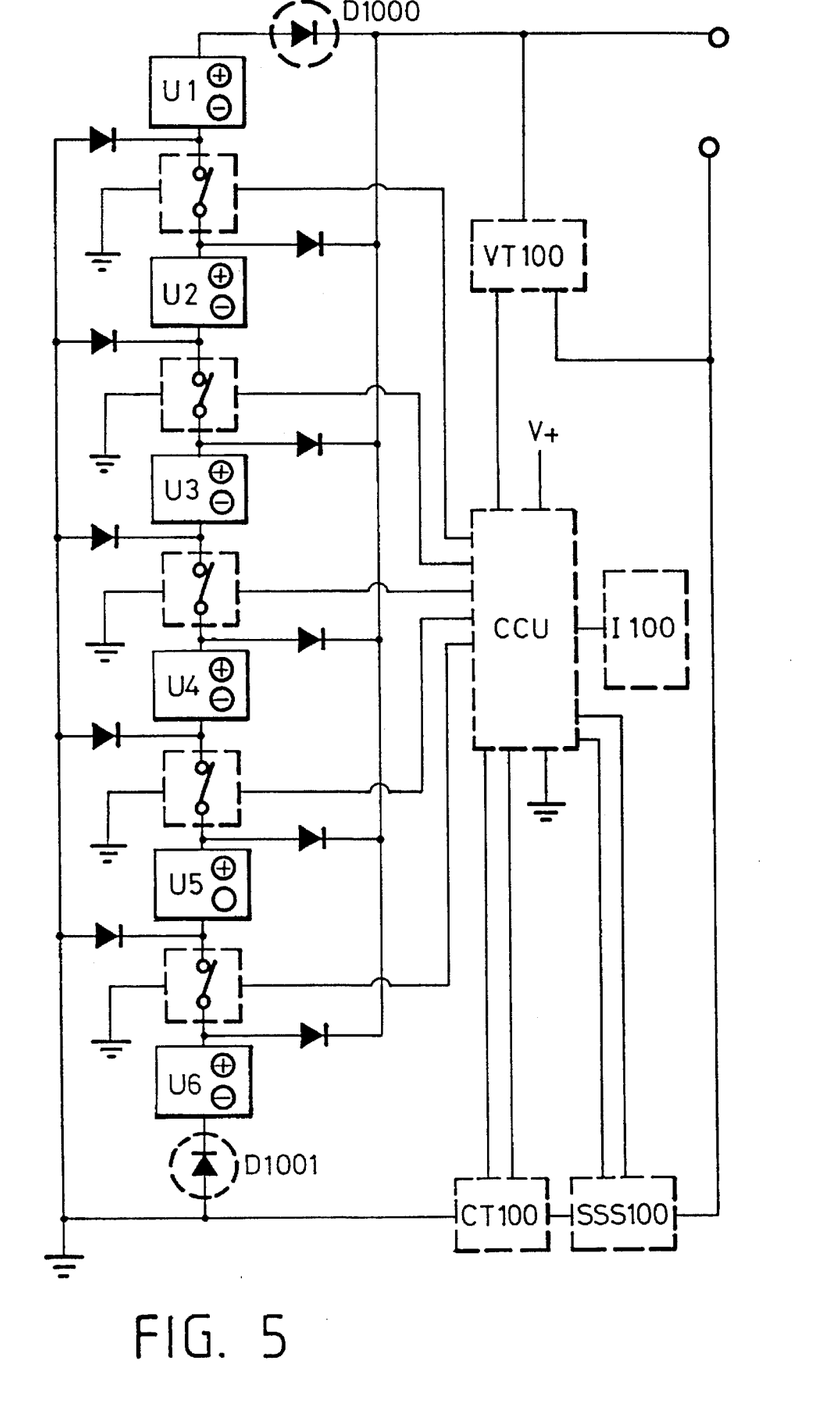
FIG. 5 is a view of a power unit employing a plurality of single-pole switches.

If certain circuit efficiency is desirable and there is space limitation, we can connect single-pole single-throw switch to diode so as to produce on/off switching output voltage function. We also can further connect a solid state switch member and output voltage current inspection member(s). Then CCU performs the same function of controlling said single-pole single-throw switches. FIG. 5 is a view of the circuit of the present invention which employs single-pole switch. In FIG. 5, D1000 and D1001 are diodes used for averaging output voltage.

Figure 6:
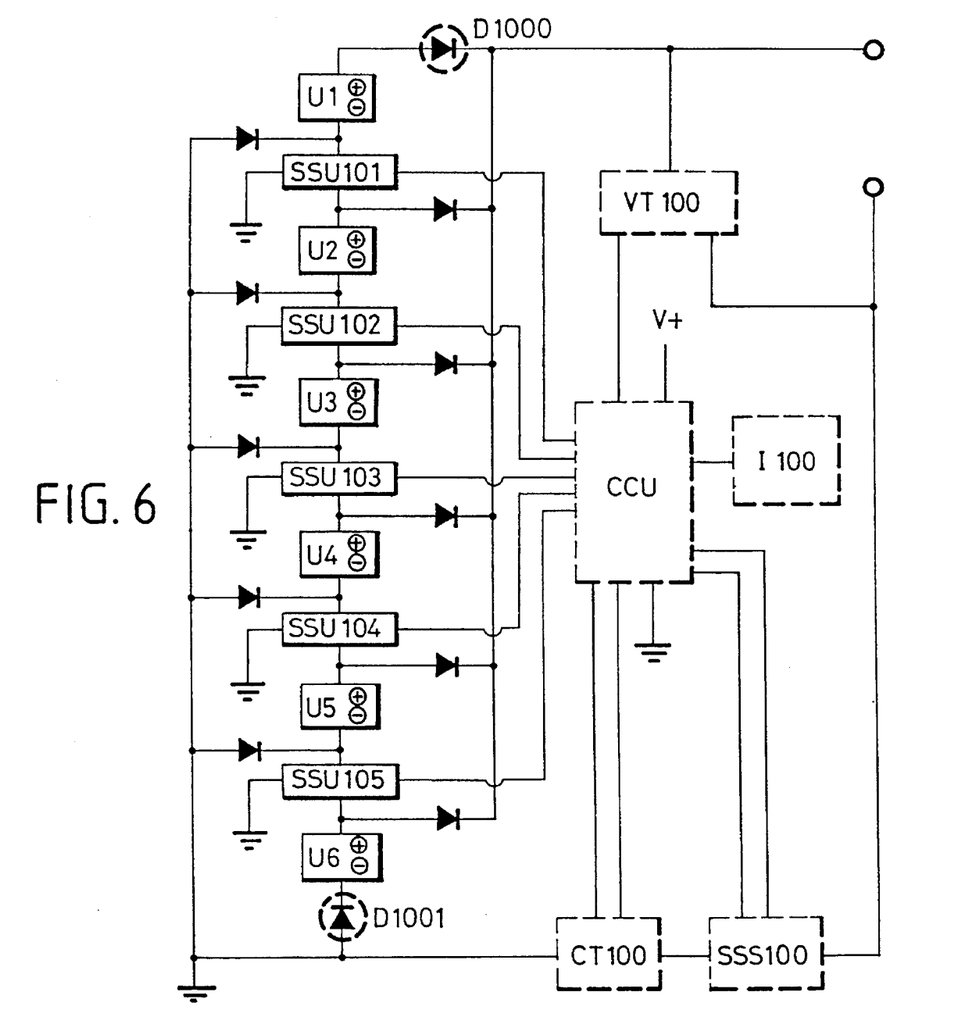
FIG. 6 is a view of the circuit of the present invention employing a plurality of solid state switches and diodes.

Electro-mechanical switch, connected between battery units in said circuit, can be replaced by solid state switch. Referring to FIG. 6, the circuit of the present invention includes solid state switches (SSU101–SSU105) and diodes. In this embodiment the switching of the solid state switches is the same as that of FIG. 5. In FIG. 6, D1000 and D1001 are diodes for averaging the output voltage. Diodes D1000 and D1001 are connected when needed. In this embodiment, we can further connect electro-mechanical switch contact on both sides of solid state switches to form SSU101–SSU105. By means of following operation order, it can reduce voltage drop, loss, and heating. The operation order of this circuit is as follows:

At "on" position, the (on) operation of solid state switch is before the electro-mechanical switch.

When solid state switch is used as a means of linear control or PWM switch control, the electro-mechanical switch which is connected to it will not operate. Said solid state switch and the electro-mechanical switch can be controlled by CCU, or manually, or electro-magnetically, or mechanically, or hydro-dynamically.

Figure 7:
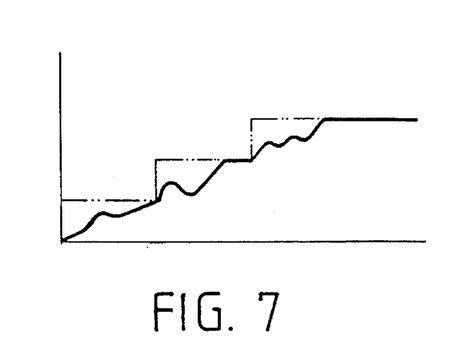
FIG. 7 is a timing diagram of a linear output voltage and graded output voltage supplied by circuit of FIG. 6.

Referring to FIG. 7, if the adjustment of a large voltage of a voltage potential grade is needed, electro-mechanical switch can achieve it so that heat loss will be less.

Figure 8:
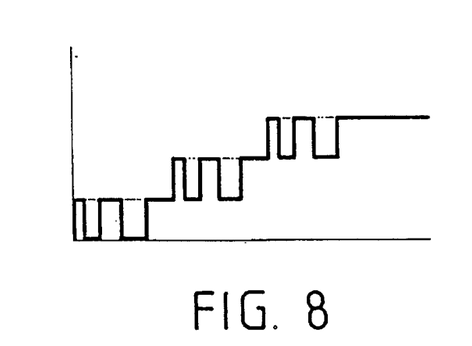
FIG. 8 is a timing diagram of chopped output voltage and graded output voltage supplied by circuit of FIG. 6.

By operating electro-mechanical switch, it enables to obtain the needed output voltage, and then CCU controls it and each solid state switch member outputs chopped current, or controls driven current of each linear solid state switch member, or by means of control over the battery unit which has the higher potential grade between battery units arranged in series or parallel, it provides basic voltage of battery units connected to solid state switch member of driven pulse range so as to attain average output voltage adjustment. For example, CCU controls SSU101, SSU102, SSU104, SSU105, which are all mutually connected, and SSU103 is controlled by chopped wave and its output is as shown in FIG. 8. If we want to trim the adjustment of a large voltage higher than a voltage of a battery unit we can do it by means of electro-mechanical switch because it has graded basic voltage.

The above-described embodiments of the present invention have many advantages. For example, their control over the power unit is suitable for control of a plurality of independent DC power sources; the elimination of sparkles; and also continual adjustment and feedback control of the output voltage. An individual and independent DC voltage source can be considered and used as a battery unit.

According to the teachings of the present invention, switch member between each battery unit can use electro-mechanical switch and/or solid state switch member in accordance with needed function and economy.

Figure 9:
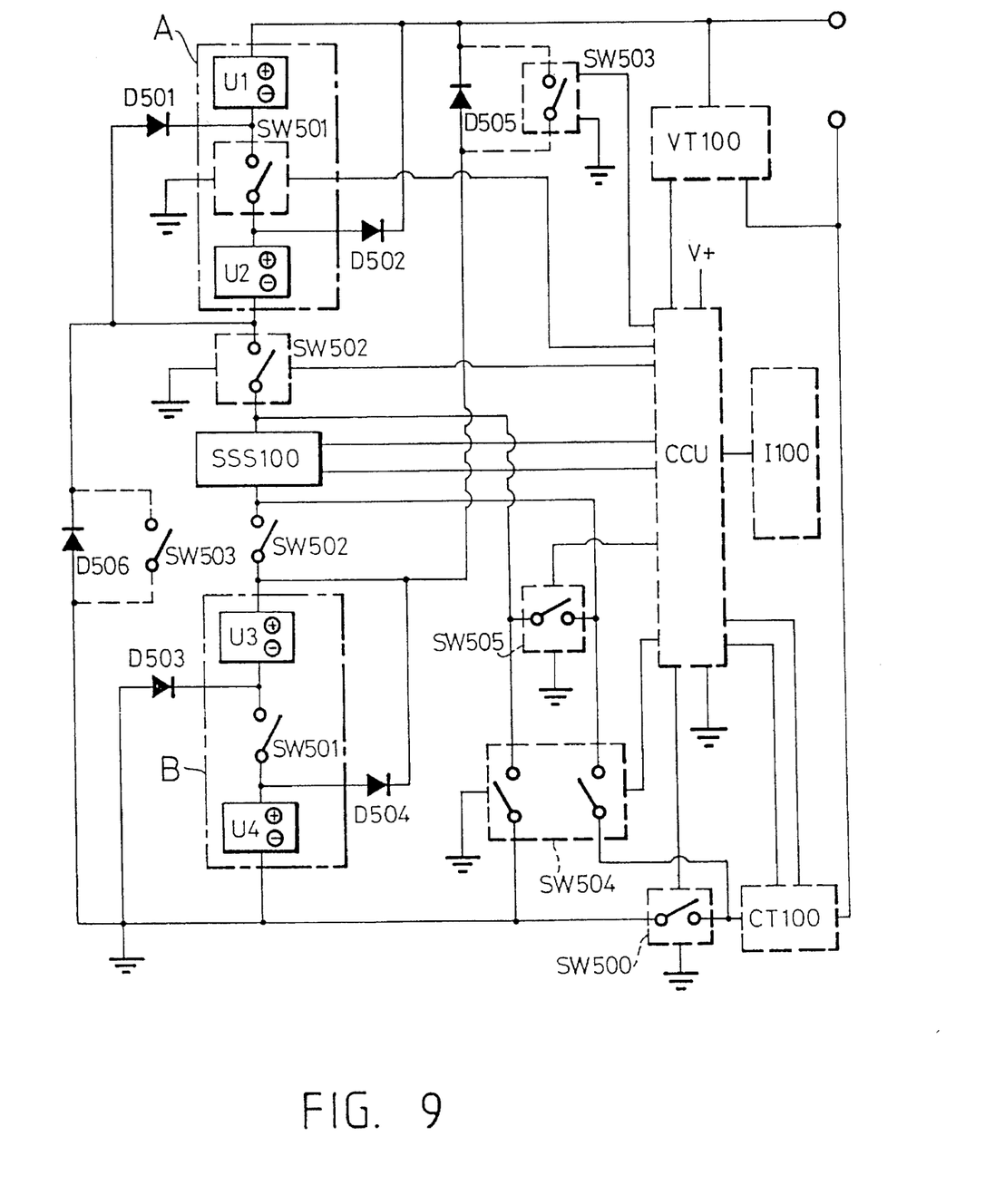
FIG. 9 is another embodiment of an off-on switch for control over a commonly used solid state switch member.
Figure 11:
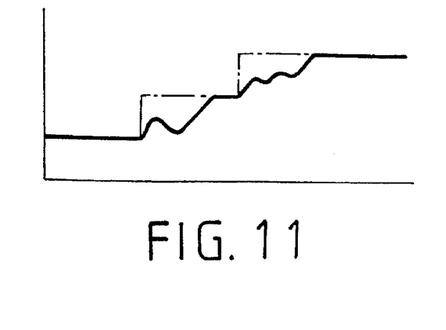
FIG. 11 is a timing diagram of linear output voltage supplied by a power unit shown in FIG. 15.
Figure 12:
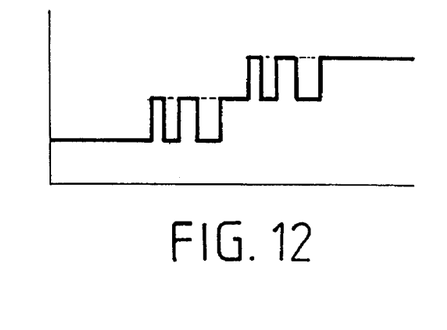
FIG. 12 is a timing diagram of chopped output voltage supplied by a power unit shown in FIG. 15.

If said embodiments are intended to use a single solid state switch for linear or chopped output voltage control output between each gradient voltage (as shown in FIGS. 7 and 8), we can achieve this goal by means of circuit shown in FIG. 9. Referring to FIG. 9:

two or more than two sets of battery units of the same voltage and/or the same capacity, and a solid state switch member, wherein the solid state switch member is connected in the middle section, such that the number of units connected to a first and a second terminals of the solid state switch member, respectively, is the same;

solid state switch member has on-off switch SW502 for selection of output control and for output switch connected at its output end; that is, when all units are parallel, solid state switch member is turned on or off to provide replacement of output switch and to control and adjust output current for linear or chopped output voltage; if linear or chopped wave adjustment functions of output gradient voltage do not involve all power units, and are connected in series, its output will be as illustrated in FIGS. 11 and 12. Then said on-off switch can make a diverse choice, whether it will be connected or it will be replaced. Each power unit which is respectively connected to the first or second terminals of the solid state switch SSS100 has a pole end which is directly connected through a diode or switch to two output terminals of different polarity, and another pole end of a unit which is connected to the first terminal of the SSS100, and then guided through diode or the respective control switch to the directly connected output end of the second terminal, which is connected to the first terminal of the SSS100 and then guided through diode or the respective control switch to the directly connected output end of the first terminal;

auxiliary switch is connected to two power connecting ends of solid state switch member, when solid state switch is in conducing state, the auxiliary switch will close to eliminate voltage drop and thermal loss, this switch is employed for diverse choice;

CCU unit, input control device, voltage and current control devices can be used to control said switches.

As shown in FIG. 9, a power unit of the present invention includes two or more than two sets of power units $U_1$–$U_4$ of the same voltage, and/or the same capacity, wherein (1) $U_1$, $U_4$ are connected for EB output; (2) $U_1$, $U_2$ are connected in series and then are paralleled with $U_3$, $U_4$ for 2×EB output: (3) $U_1$–$U_4$ are connected in series for 4×EB output.

Figure 10:
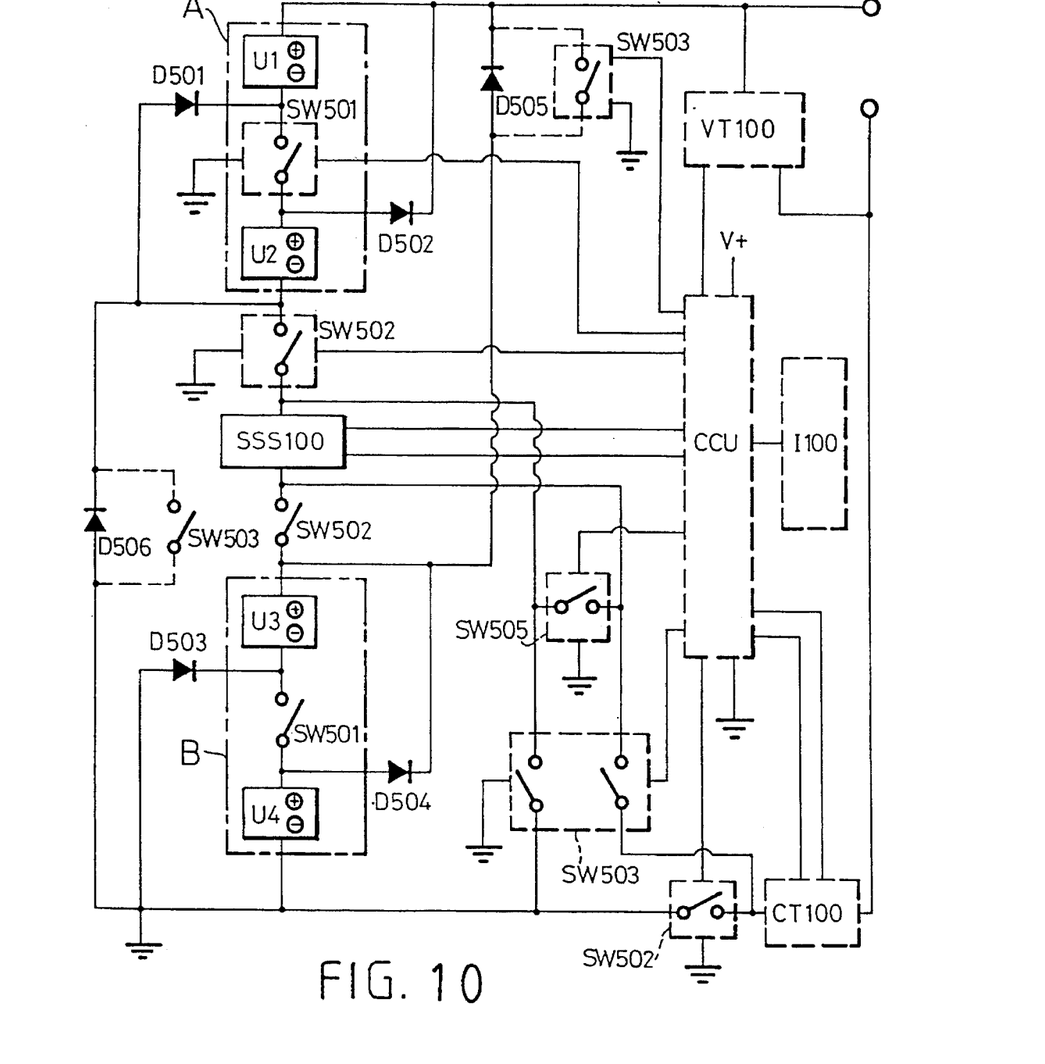
FIG. 10 is another embodiment of the present invention.

A control switch SW501 is connected between $U_1$ and $U_2$, and a control switch SW502 is connected between the negative end of the power unit $U_1$ and positive end of $U_2$. A current-conducting diode D501 is connected in parallel with $U_2$ and SW501. Another current-conducting diode D506 is connected in series to a switch set SW503 which will close when power units are in parallel so as to eliminate thermal loss of diode D506. The diode D503 is also paralleled between power unit $U_3$ and an output negative end. Another diode D504 is connected in parallel between positive ends of power units $U_3$ and $U_4$. Another diode D505 is paralleled between positive end of power units $U_4$ and positive end of output. Both ends of these two diodes can also be paralleled to switch SW503 so that it can close when all power units are paralleled in order to eliminate the thermal loss of diode D505, a diode D502 is also paralleled between the power unit $U_2$ and an output positive end. The solid state switch SSS100 is connected between serial points of half set of power units and at the independent normally open contact points of two sets of SW502. Two power ends of solid state switch SSS100 are connected in series to output two independent constant open contact points set of control switch SW504, and then are connected to both contact ends of output switch SW500. When the solid state switch member adjusts output power, SW500 tends to open its circuit, and output of solid state switch controls to turn on and off the switch SW504. The output switch SW500 can be further closed to eliminate the loss of pressure-drop. If this function is not needed, the output switch SW500 can be replaced by a set of normally opened contacts of the control switch SW502. An output switch SW504 of the solid state switch also can be replaced by two sets of independent normally opened contacts added from on-off switch SW503 (as shown in FIG. 10). An auxiliary switch SW505 which is further paralleled to both contact ends of SSS100 can be provided to close contacts of the auxiliary switch when solid state switch SSS100 is in conducting state.

Said circuit provides connection of battery unit in series and/or in parallel, in order to gain a required voltage output. The number of battery units can be increased to gain more wide range of graded voltage output.

Summarizing the above-described principles of the present invention, the switch of the present invention can be fulfilled according to the embodiments illustrated in FIGS. 1, 4 and 5. The only difference is that the series sets of its battery units are divided into two symmetric sets A and B. One terminal of the battery unit of each set is respectively connected to both output ends of different polarity by means of diode or switch. Another terminal of each set is respectively connected to both terminals of solid state switch SSS100 which is connected to the independent normally opened contacts of an on-off switch, and then is connected to the same poles of the same set of independent battery units by means of diode or on-off switch. As illustrated in FIG. 9, the negative terminal of A set is connected to negative output end or additional switch SW503 by means of conductive diode D506, and is connected to the negative terminal of the same set $U_1$ by means of diode D501. The negative terminal B set is connected to negative output end or additional switch SW503 by means of conductive diode D505 so as to be connected to output negative end, when the battery unit initiates parallel low-pressure output, and is connected to the negative end of the same set $U_4$ by means of diode D504. In practical applications, a diode and/or a control switch can be selected to be used as current-conducting elements among battery units. If a two-phase current-conducting element is selected, the circuit structure can either supply power or initiate inverse-phase input of charge. When a two-phase solid state switch is also selected, it can further adjust linear or chopped wave input.

Figure 17:
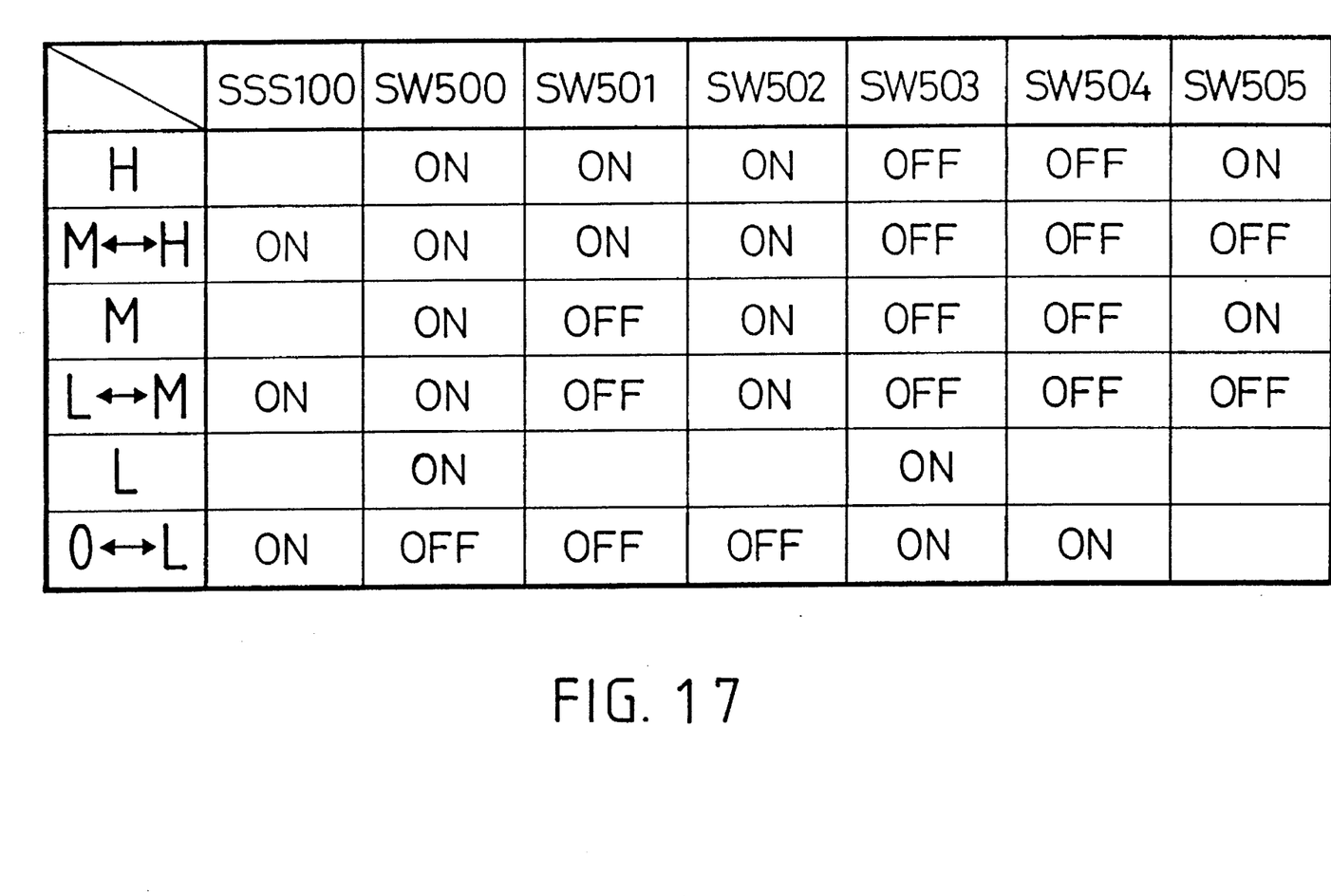
FIG. 17 is a chart of sequence of on/off states of respective switches according to the present invention.

FIG. 17 shows the states of each switch in FIGS. 9 and 10.

Figure 13:
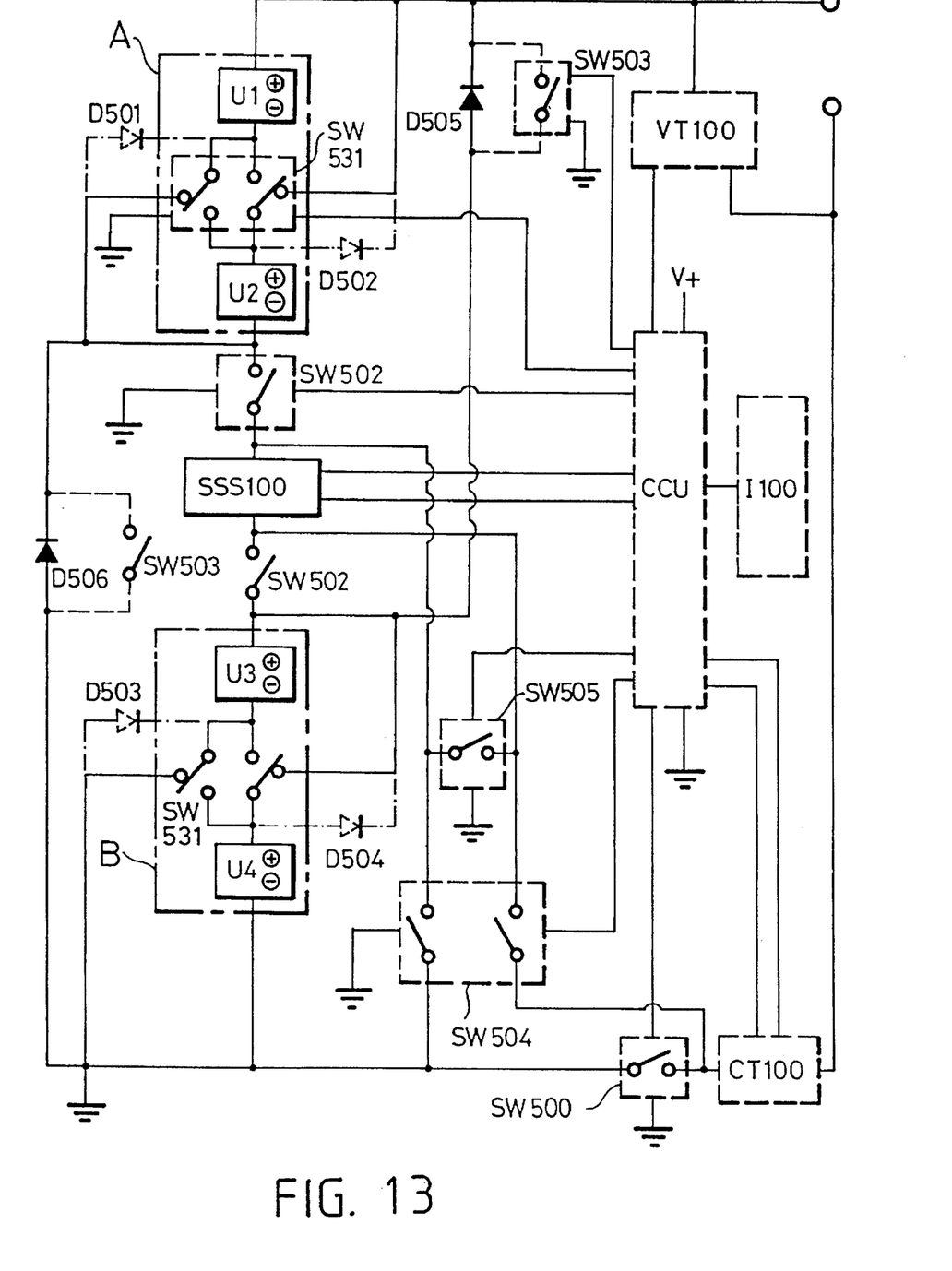
FIG. 13 is an embodiment of a serial control switch replaced by two-pole two-throw switch.
Figure 14:
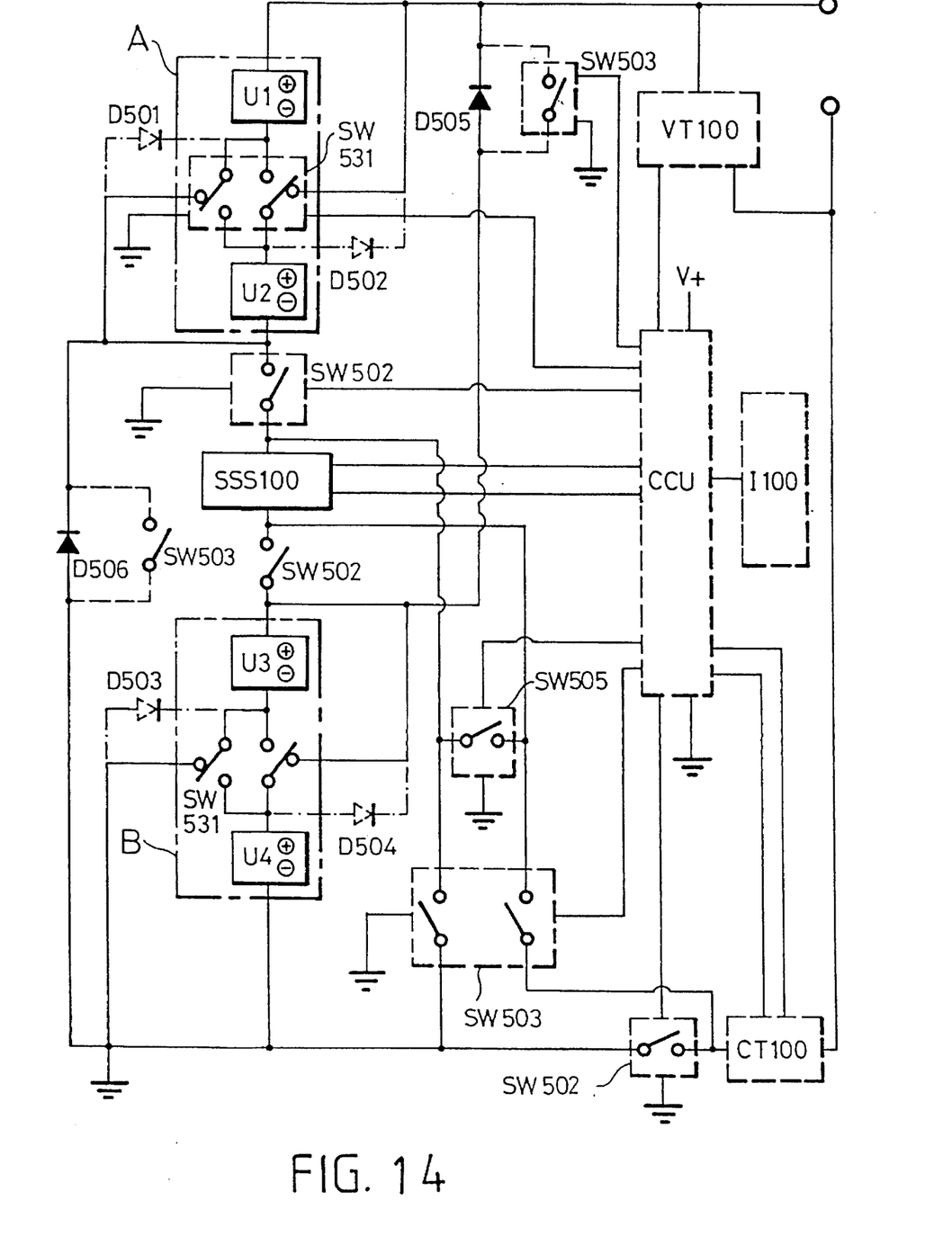
FIG. 14 is another embodiment of the present invention.

As illustrated in FIG. 13, in order to avoid the thermal loss and pressure-drop on diodes, the control switch SW501 can be replaced by the two-pole two-throw control switches SW531. As shown in FIG. 14, SW500 can be replaced by switch SW502, and SW504 can be replaced by SW503. If it is necessary, the embodiments shown in FIGS. 13 and 14 can include a diode between common contacts and normally opened contacts of two-pole two-throw switch, as shown in FIG. 14, in order to reduce sparks when it is cut off.

Said circuit is used for sparkless on-off order control, and used for voltage or current adjusting (including slow voltage increasing or slow voltage reducing, or constant voltage, or slow current increasing, or slow current reducing, or constant current or inspection predetermined current).

Figure 15:
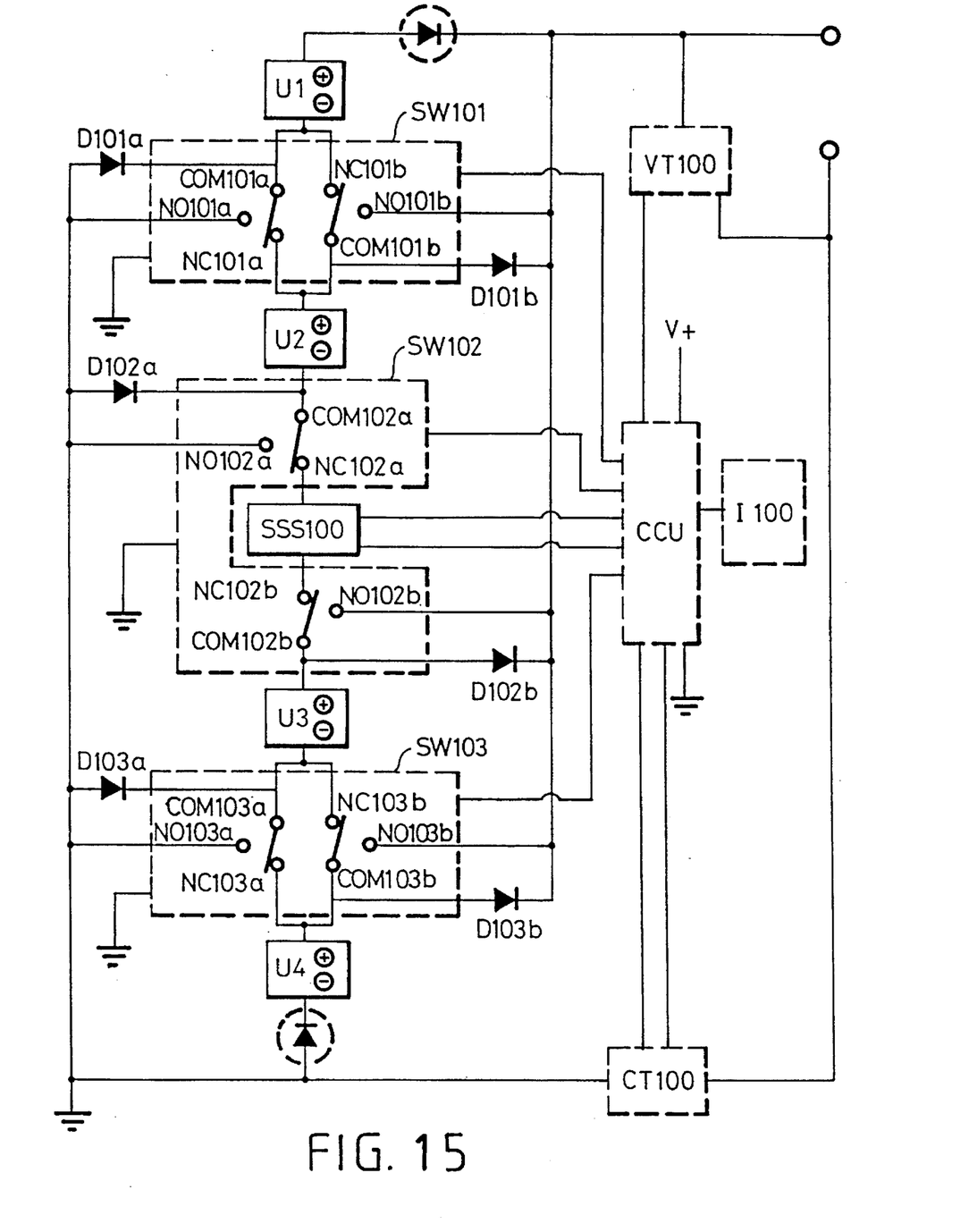
FIG. 15 is the first low-cost power unit embodiment.

As shown in FIG. 15, which is based on FIG. 14, a low-cost embodiment of the present invention includes two-pole two-throw switch SW102 which replaces SW502 in FIG. 14. The switch SW503 is not employed. Two terminals of solid state switch member SSS100 are connected to synchronous switches SW102 (a, b).

Figure 16:
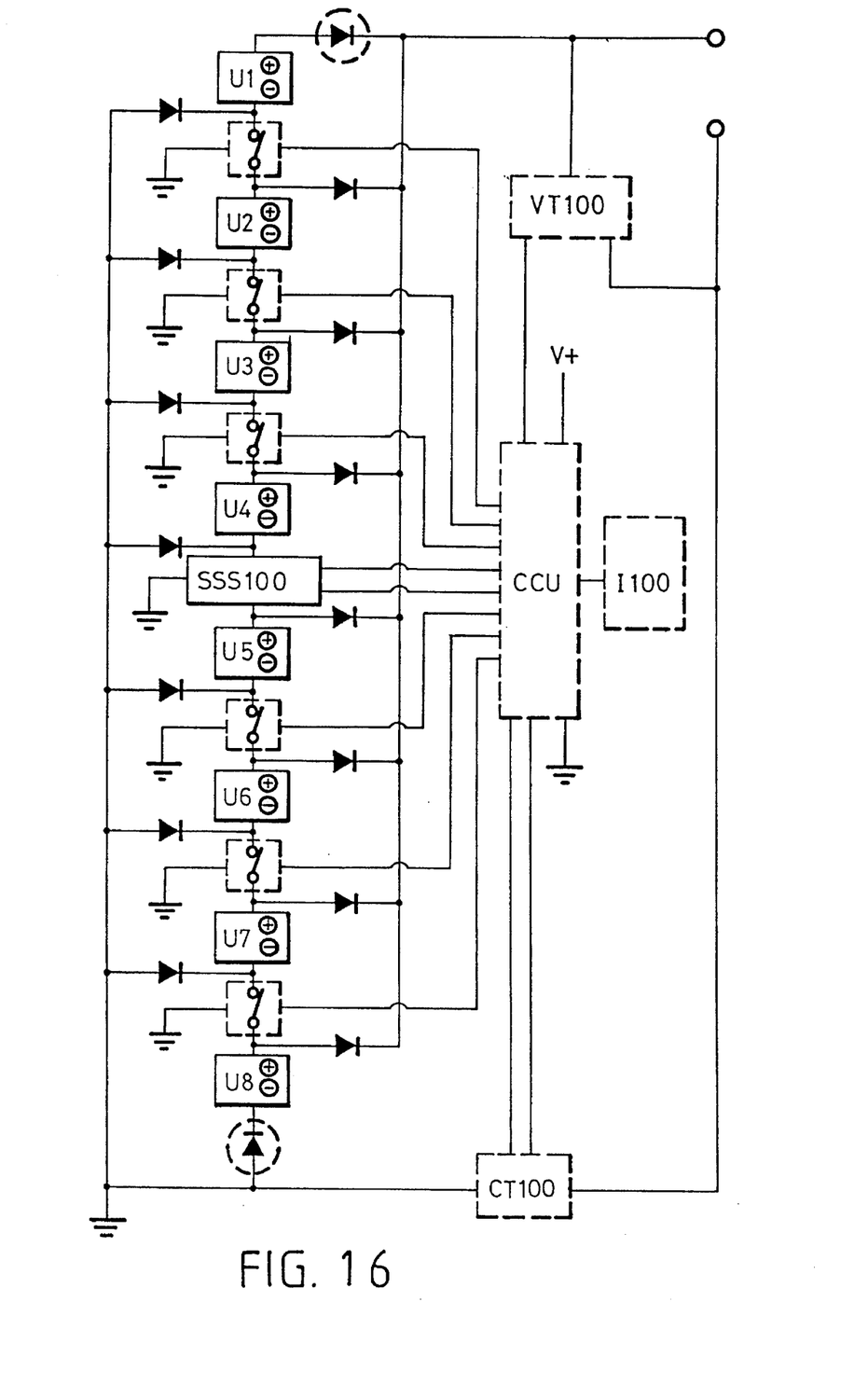
FIG. 16 is the second low-cost power unit embodiment.

As shown in FIG. 16, another embodiment of the low-cost circuit based on the embodiment shown in FIG. 5 with the exception that the middle section of battery units has solid state switch member SSS100 for the adjustment of linear or chopped voltage.

In conclusion, object of the present invention is to provide an effective newly designed circuit which can output graded voltage, and further linearize or to chop the obtained graded output voltage by the solid state switch member, non-sparkle switching of the circuit and a low-ripple PWM of the output voltage.

I claim:

1. A power unit with controlled output voltage comprising a first, a second, a third and a fourth substantially identical battery unit, respectively, which are interconnected by a central control unit for connecting said battery units in a series and parallel arrangement for providing a required output voltage on a pair of output terminals, the output terminals including positive and negative output terminals, respectively; each of said first, second, third and fourth battery units including a positive and a negative pole, respectively; said power unit further comprising a first, a second, and a third electro-mechanical switches and a solid-state switch, each of said first, second and third electro-mechanical switches having first and second common contacts, first and second normally closed contacts, and first and second normally opened contacts, respectively, such that in the first and third electro-mechanical switches, the first common contact is connected to the second normally closed contact, and the second common contact is connected to the first normally closed contact, wherein said first electro-mechanical switch is connected between said first and second battery units such that the negative pole of the first battery unit is connected to both the first common contact and the first normally closed contact of the first electro-mechanical switch, wherein the positive pole of the second battery unit is connected to both the first normally closed contact and the second common contact of the first electro-mechanical switch, wherein said third electro-mechanical switch is connected between said third and fourth battery unit such that the negative pole of the third battery unit is connected to both the first common contact and the second normally closed contact of the third electro-mechanical switch and wherein the positive pole of the fourth battery unit is connected to both the first normally closed contact and the second common contact of the fourth electrical-mechanical switch, wherein the negative pole of the second battery unit is connected to the first common contact of the second electro-mechanical switch, wherein the positive pole of the third battery unit is connected to the second common contact of the second electro-mechanical switch, wherein the solid-state switch has a first, a second, a third and a first terminals, wherein the first normally closed contact of the second electro-mechanical switch is connected to the first terminal of the solid-state switch, wherein the second normally closed contact of the second electro-mechanical switch is connected to the second terminal of the solid-state switch, wherein a first averaging diode is connected between the positive pole of the first battery unit and the positive output terminal, wherein a second averaging diode is connected between the negative pole of the fourth battery unit and the negative output terminal, such that when each of said electro-mechanical switches is actuated by the central control unit, the respective common contacts are connected to respective normally opened contacts or to respective normally closed contacts, thereby providing serial or parallel connection of each battery unit, wherein the first normally opened contacts of all the switches are connected to ground, and wherein the second normally opened contacts of all the switches are connected to the positive output terminal, wherein a first, a second and a third pair of diodes are connected to said first, second and the third electro-mechanical switches, respectively, each pair of said diodes having first and second diodes, wherein each of the diodes has respective positive and negative terminals, wherein each pair of the diodes is connected to each electro-mechanical switch such that the first diode of the pair is connected by its negative terminal to the first normally opened contact and by its positive terminal to the first common contact, and the second diode of the pair is connected by its negative terminal to the second common contact and by its positive terminal to the second normally opened contact, wherein the negative terminals of all respective first diodes are interconnected and connected to ground, and wherein the positive terminals of all respective second diodes are interconnected and connected to the positive output terminal, wherein the solid-state switch is controlled by the central control unit through the respective third and fourth terminals of the solid-state switch for smoothing the required output voltage.

* * * * *